United States Patent [19]

Balser et al.

[11] Patent Number: 4,558,594
[45] Date of Patent: Dec. 17, 1985

[54] PHASED ARRAY ACOUSTIC ANTENNA

[75] Inventors: Martin Balser, Encino; Frank E. Ambler, Sepulveda, both of Calif.

[73] Assignee: Xontech, Inc., Van Nuys, Calif.

[21] Appl. No.: 624,465

[22] Filed: Jun. 25, 1984

[51] Int. Cl.$^4$ .......................... G01W 1/02; G01S 9/66
[52] U.S. Cl. ..................................... 73/189; 73/861.25
[58] Field of Search ................ 73/861.25, 170 R, 189; 343/5 W; 367/87, 90

[56] References Cited

U.S. PATENT DOCUMENTS 3,675,191  7/1972  McAllister .................... 73/170 R X

FOREIGN PATENT DOCUMENTS 2499252  8/1982  France .................................. 367/87

OTHER PUBLICATIONS

D. N. Asimakopoulos et al., "An Acoustic Sounder—Lower Atmosphere", Journal of Physics E, vol. 10, No. 1, pp. 47–50, Jan. 1977.
I. A. Bourne et al., "The Remote Sensing of Wind—Using Acoustic Radar", I.M.C. Conference, Moscow, USSR (May 1979), pp. 549–556.
H. D. Parry et al., "The Design and Operation of an Acoustic Radar", IEEE G.E. Symposium, Wash., D.C. (Aug. 1971), pp. 58–64.

Primary Examiner—Charles A. Ruehl
Attorney, Agent, or Firm—Harris, Kern, Wallen & Tinsley

[57] ABSTRACT

A system for remote measurement of wind velocity in the atmosphere, operating from ground level. An array of acoustic transducer elements which provide for transmitting a beam of acoustic energy along a path and receiving such transmitted energy as scattered by wind in the path. The system includes signal transmitting means for driving the arrays, and signal receiving means, with a switching system for connecting the elements of the array to the transmitting means and to the receiving means, for operation as a monostatic system. Phase control for the transmitted signals comprising phase shifters and switches for selectively connecting driving signals to the elements of the array for driving selected elements at different phases to produce first, second and third beams in sequence at three different predetermined angles from a single antenna.

10 Claims, 7 Drawing Figures

PHASED ARRAY ACOUSTIC ANTENNA

BACKGROUND OF THE INVENTION

The subject invention relates to an atmospheric wind measuring apparatus utilizing acoustic beams, and more specifically, to a monostatic system with a fixed array of acoustic transducer elements.

Doppler acoustic systems are used to measure atmospheric winds remotely from a site on the ground. Valid measurements are obtained typically to heights of many hundreds of meters, occasionally to well over a kilometer. Such instruments are therefore of considerable value in obtaining continuous wind profiles for use in connection with pollution monitoring, wind power, meteorology, atmospheric modeling and other applications.

A full description of the wind vector at a given location and time requires the determination of three components. These are frequently taken to be the east, north and vertical components. Different component resolutions, e.g., speed, direction and vertical, are equivalent, and each set can be readily converted to the other.

On configuration of a doppler acoustic system for measurement of wind velocity and direction is shown in U.S. Pat. No. 3,889,533. This is a bistatic system with a transmitter and two or three receivers spaced from the transmitter. Typically the transmitter directs a beam vertically upward and the receivers provide a measure of scattering at various elevations along the beam. The receiver outputs are processed to provide a velocity vector indicating wind velocity and direction.

Another configuration of a doppler acoustic system that measures three independent components of wind is the monostatic system, i.e., one in which the same antenna serves as transmitter and receiver of the acoustic energy. FIG. 1 shows schematically how this is normally accomplished.

Three different antennas 11, 12, 13 are employed, each generating one beam to measure one of the three wind components. The beam of antenna 13 points vertically, the beam of antenna 11 points towards the east, and the beam from antenna 12 toward the north, the latter two at some angle $\gamma$ from the vertical. The details of pointing angles are not critical; any set of three independent measurements can be converted to the desired wind components. Most commonly, each antenna consists of a reflecting dish, on the order of 1 meter in diameter, irradiated by an acoustic driver, or possibly a small cluster of drivers.

Such systems suffer from two limiting disadvantages. First, the three antennas with their acoustic shields are very large and bulky, and require considerable effort to move and align. Second, the radiated power available from a single acoustic driver limits the range (altitude) from which usable returns are obtained.

A monostatic system using four antennas, each comprising an array of drivers or acoustic transducer elements in the form of commercial loud speakers is shown in U.S. Pat. No. 3,675,191. The beams from the four antennas are fixed in direction, with the return signals from the four antennas being mixed in various combinations to provide the desired output.

It is an object of the present invention to provide a new and improved acoustic wind velocity measuring system utilizing only a single antenna having an array of acoustic transducer elements or drivers. This provides a significant advantage over prior art systems in that the size, cost and weight of the antenna arrays is a significant factor in manufacture, installation and operation of wind measuring systems.

It is a further object of the invention to provide such a system which can provide beams of acoustic energy at three different predetermined angles from a single antenna for transmitting acoustic energy along three different paths and receiving the transmitted energy as scattered by wind in the paths, with the received energy being converted to electrical signals for processing to provide the wind velocity vector. An additional object of the invention is to provide such a system wherein the three beams are produced in sequence by controlling the phase of the driving input to the individual elements of the antenna array.

It is a particular object of the invention to provide such a system wherein the desired beam paths and wind velocity information can be achieved while requiring only a single 90° phase shift in the driving signals.

Other objects, advantages, features and results will appear in the course of the following description.

SUMMARY OF THE INVENTION

A single antenna monostatic system for remote measurement of wind velocity utilizing acoustic doppler. An antenna in the form of an array of acoustic transducer elements providing for transmitting a beam of acoustic energy along a path and receiving such transmitted energy as scattered by wind in the path. Signal transmitting means including an electrical signal generator providing an electrical signal for driving the elements, and phase shifting means having the electrical signal as input and providing as output one or more shifted electrical signals, with switching for selectively connecting the signals to the elements for driving selected elements at different phases to produce three beams in sequence at three different predetermined angles. One or more receivers and a signal processor, with the transducer elements being selectively connected to the transmitting means and to the receivers, with the signal processor providing appropriate manipulation of the received signal or signals to compute the desire vector wind velocity. An antenna with a specific orientation or boresight angle permitting simple phase shift requirements, particularly a 90° phase shift which is readily achieved with a minimum of electrical circuitry.

DESCRIPTION OF THE PREFERRED EMBODIMENTS

The present invention uses a phased array of acoustic transducer elements or drivers to function as a single antenna. In its simplest form, an array comprises a number of identical elements, each of which radiates an amplitude pattern $f_1(\theta,\phi)$. Then, each element is assigned a location in the array, generally linear or planar, a relative phase, and if desired, a weight. Taken as a set of point sources, the array then yields an amplitude pattern $f_2(\theta,\phi)$. The overall radiated (power) antenna pattern is then $$F(\theta,\phi) = |f_1(\theta,\phi) f_2(\theta,\phi)|^2$$

By changing the relative phases assigned the elements of the array, different beams can be formed. The desired phases are produced electrically, and thus electrical switching obviates the need for separate antennas or mechanical motion of an antenna. Further, each element of the array can be subject to a relatively low power level, while the full antenna can radiate much more power than could be supported by a feed in a conventional reflecting antenna.

Figure 1:
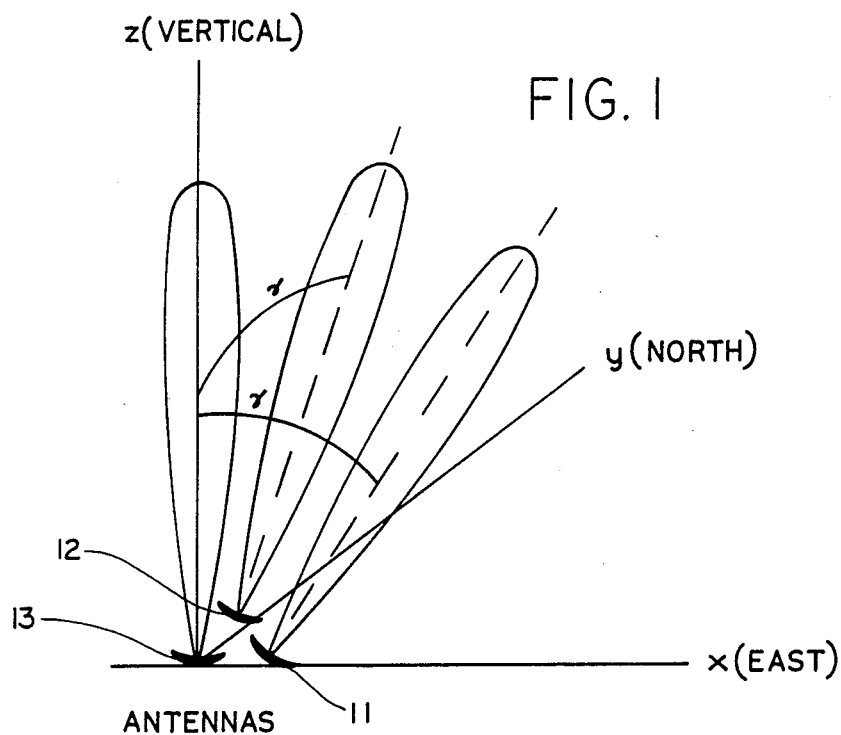
FIG. 1 is a diagram illustrating three beams used in measuring three wind components.

The present invention utilizes a single antenna, such as the antenna 11 of FIG. 1. This antenna comprises an array 16 of acoustic transducer elements 17. In the embodiment shown in FIGS. 2 and 3, the array comprises N columns and N rows of elements, where N is a small whole number. In the embodiment illustrated, N is 7. Each acoustic transducer element typically comprises a driver 18 with coil and diaphram and a horn 19 and operates in the same general manner as a radio speaker.

In contrast with the conventional antenna configuration of a single source or feed illuminating a reflecting dish that creates the wave front, in the antenna of the present invention the mouth of the horn of the transducer element is directly a section of the radiating wave front. Typically, its dimensions are some fraction of a wavelength, thus on the order of 12-20 cm; elements separated in an array by a large fraction of a wavelength or more tend to create undesirable grating lobes.

Figure 2:
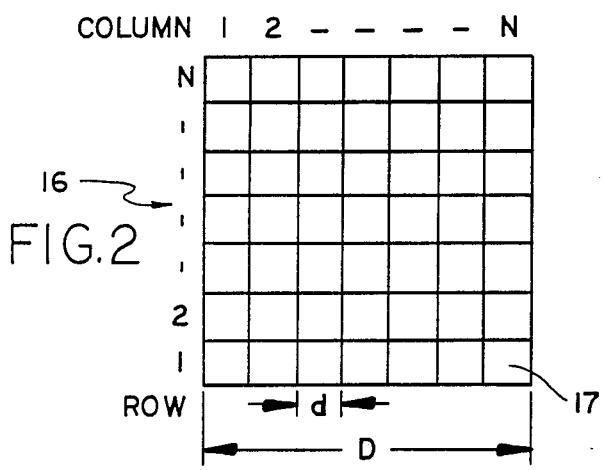
FIG. 2 is a plan view of an antenna with N columns and N rows of transducer elements.
Figure 3:
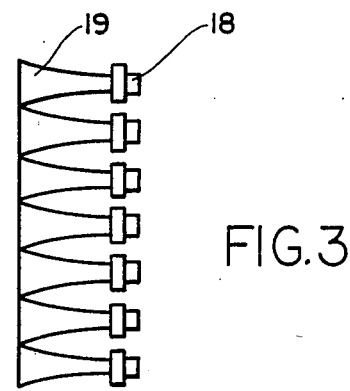
FIG. 3 is a side view of the antenna of FIG. 2.

In the array of FIG. 2, square elements of side d are arranged in the N×N array, providing an antenna aperture of D=Nd. The array of FIG. 2 is both convenient and economical, but is not a limitation of the generality of array configurations.

The most straightforward use of an acoustic array is to mount it in a horizontal plane. When all of the elements are fed in phase, a vertical (first) beam is created, corresponding to the illumination of a D×D aperture. This antenna with no further capability is already well suited to be the transmitter for an acoustic sounder or a bistatic doppler acoustic system, both of which employ only a vertical transmitted beam. The greater transmitted power available from the array would benefit all such systems by increasing the altitude range of their useful operation.

Next consider the phased array of the present invention. Suppose that the transmitted signal, typically a pulse at the radiated frequency f, is fed to all elements in column 1, the same signal with a time delay $\tau$ is fed to all elements of column 2, and so forth to a delay of (N-1)$\tau$ to all elements of column N. Phase shifts of $\sigma = 2\pi f \tau$ in column 2 to one of (N-1)$\sigma$ in column N would be eqivalent, for systems of interest that employ a narrow band. The (second) beam thus generated would tilt toward the right, say eastward, at an angle from the vertical determined by $$\frac{2\pi d}{\lambda} \sin \theta = \sigma.$$

By proper choice of $\tau$, the desired beam direction is achieved. if on a succeeding pulse, the delay $\tau$ (phase shift $\sigma$) is applied to row 2, etc., the (third) beam is directed at the angle $\theta$ from the vertical, but in a northward direction. Thus are the three desired beams obtained.

As an example, if we desire $\theta = 30°$, then one beam, the vertical, would be generated at boresight, which is the direction perpendicular to the face of the array. The other two beams are generated at angle 30° from boresight, in orthogonal planes that intersect along the boresight.

In a preferrred beam configuration, the three beams are more symmetrical with respect to boresight and possess certain practical advantages as well over the preceding configuration where the array was horizontal with the antenna boresight vertical.

Suppose that the boresight is pointed at an angle $\alpha$ from the vertical, such as in the direction of northeast. Suppose further that the columns of the array are aligned parallel to the plane determined by the vertical and the boresight. If the observation coordinates are x, y, z, which have been identified with east, north and vertical respectively, then the coordinate system of the antenna is given by $$x' = \frac{1}{\sqrt{2}} (x + y) \cos \alpha - z \sin \alpha$$

$$y' = \frac{1}{\sqrt{2}} (-x + y)$$

$$z' = \frac{1}{\sqrt{2}} (x + y) \sin \alpha + z \cos \alpha$$

Then a beam transmitted in the x', z' plane at an angle $\alpha$ from the z' axis is pointed vertically, i.e., along the z axis. Also if a pair of beams is transmitted at angles $\pm\beta$ from the z' axis in the y'z' plane, for some angle $\beta$ these beams will be in the x, z and y, z planes at some angle $\gamma$ with respect to the z axis. This set of three beams is again the desired set.

The three angles $\alpha$, $\beta$ and $\gamma$ are related by $$\tan \beta = \sin \alpha$$

$$\tan \gamma = \sqrt{2} \tan \alpha$$

and for small angles $$\alpha \simeq \beta \simeq \frac{\gamma}{\sqrt{2}}$$

For example, if we choose $\gamma = 30°$, then $\alpha = 22°$ and $\beta = 21°$. To a very good approximation (considering that typical beam widths are 10° or more), the desired transmissions are obtained by tilting the antenna at an angle of 21.5° and generating the three beams at an angle of 21° from boresight as described above.

This arrangement has two advantages over that with the boresight vertical. First, all three beams are generated using the same phasing of the array, but switched to different sets of elements. Second, the angle off boresight of the oblique beams is considerably reduced, thereby decreasing both the loss due to the element pattern $f_1(\theta,\phi)$ and the potential problem with grating lobes.

The number of elements in an array of the type shown in FIG. 2 does present some practical difficulty. The 7×7 array, for example, has 49 elements.

Figure 4:
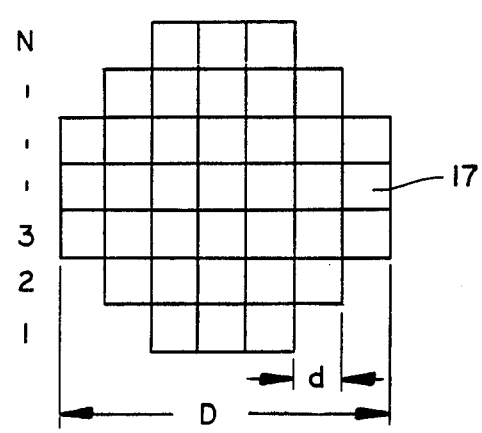
FIG. 4 and 5 are views similar to FIG. 2 showing some alternative antenna configurations.
Figure 5:
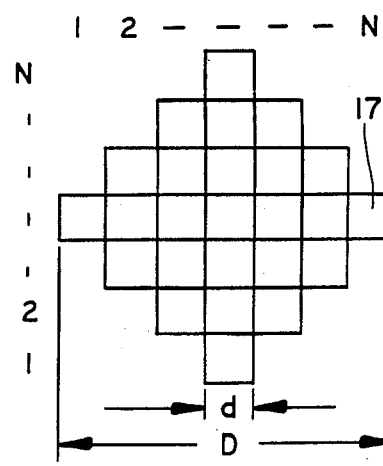

Alternative designs for an array are shown in FIGS. 4 and 5, which are subsets of the full square array of FIG. 2. In addition to the obvious advantage of requiring fewer elements, the smaller arrays provide a natural weighting of the antenna illumination. If each element is given the same power, then the aperture D effectively is illuminated more strongly at the center, less so at the edges. This weight substantially reduces the sidelobes of the antenna at the cost of a slight increase in the beam width of the main lobe.

The general technique for utilizing a phased array is to feed the array elements with the specific phase pattern that creates the desired beam, and then change that pattern to create the next desired beam. The block diagram of FIG. 6 illustrates schematically the technique of producing the three desired beams in an N×N array of tranducers as accomplished in this application.

Figure 6:
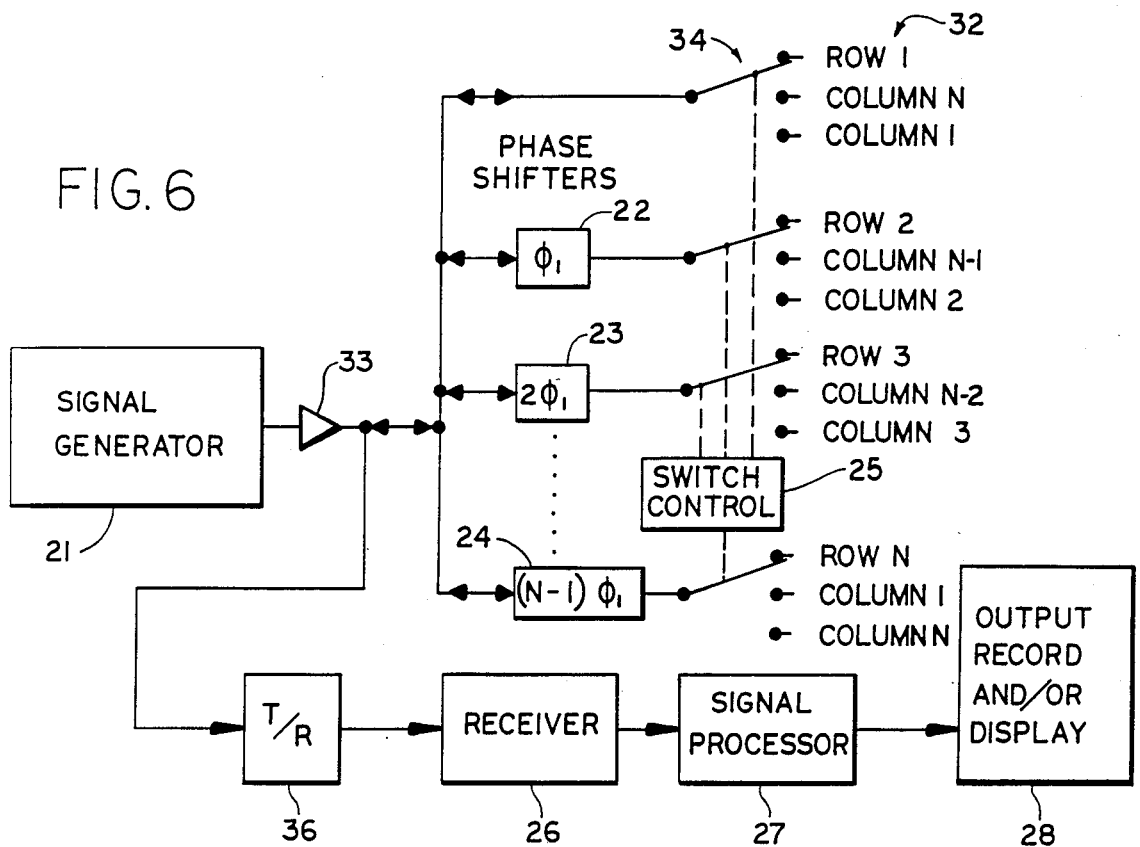
FIG. 6 is an electrical schematic in block diagram form illustrating signal transmitting means and signal receiving means for use in conjunction with the antenna array.

The system as illustrated in FIG. 6 includes a signal generator 21, one or more phase shifters 22, 23, 24, a switch control unit 25, a receiver 26, a signal processor 27, and an output unit 28. Electrical connnections to the elements of the row and columns of the array are indicated at 32. A set of switches 34 operated by the switch control 25 provides for connecting signals from the signal generator 21 and phase shifters 22 etc. to the various rows and colums of the array 32. In operation the switches 34 are selectively actuated to energize predetermined elements of the array to produce a beam in a predetermined direction. A cycle through the switch positions produces the three desired beams in sequence.

The signal from the transducer elements operated as a receiver returns through the switches 34, which remain set in the same position from the initiation of the transmitted pulse through the type typically 5-10 sec. later when the last useful return is received. Typically an amplifier or set of amplifiers is used to generate the power necessary to operate the transducer elements. Amplification may take place either ahead of or following the phase shifters, and one such amplifer is shown at 33. A transmit/receive switching device 36 is used to bypass the amplifer on the return path and also to protect the sensitive receiver 26 from the high power levels generated by the amplifier. The received signals pass through the same phase shifters, which thereby creates the same beam for reception as was used for transmission. The received signal is fed into the receiver 26, followed by the signal processor 27 and the output unit 28. The signal processor may be conventional, such as is disclosed in the aforementioned U.S. Pat. No. 3,889,533.

Further simplification of the equipment can be achieved by special choice of the phase shifts. This can be done for cases of interest with little constraint on system design, and allows considerable economy in producing the system. The phase shift $\sigma_1$ is give by $$\frac{2\pi d}{\lambda} \sin \theta = \sigma_1$$

where d is the distance between rows or columns, $\lambda$ is the wavelength of the radiated sound, and $\theta$ is the angle off boresight of the beam.

The combination given in the equation can be chosen to yield $\sigma_1 = \pi/2$ (or 90°) or another desired value. Specifically, if $d/\lambda$ is taken to be $\frac{5}{8}$ (which gives d=14 cm for a 1600 Hz frequency) then $\sin \theta = 3/8$ (or $\theta = 22°$) corresponds to $\sigma_1 = \pi/2$. Other combinations of parameters also lead to convenient phase shifts.

With the choice of $\sigma_1 = 90°$, the set of phase shifts depicted in FIG. 6 reduces in effect to a single phase shift of 90°, no matter how large the array size N. The second phase shift, 180°, is achieved by a phase reversal (change of sign) of the original signal, the third phase shift, 270°, is a phase reversal of the 90° signal, and the cycle is then repeated as often as necessary.

Figure 7:
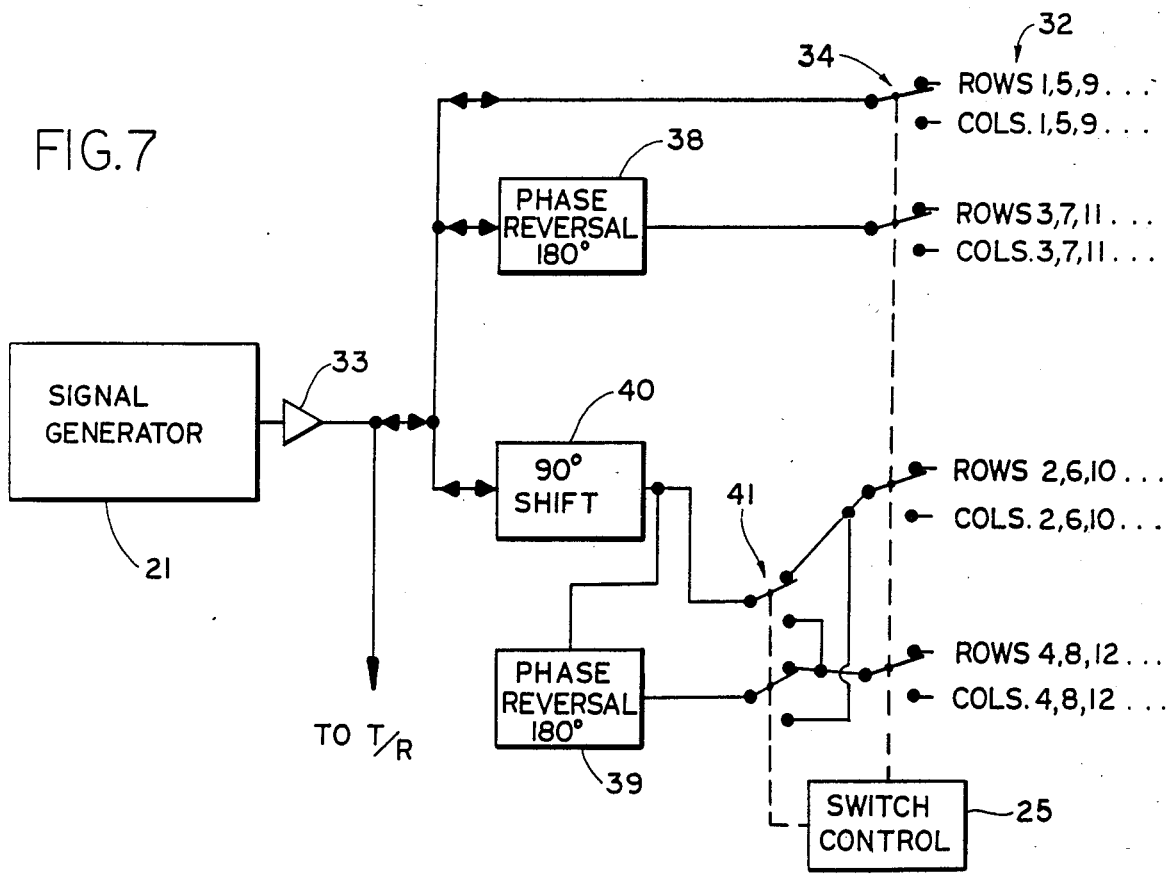
FIG. 7 is a view similar to that of FIG. 6 showing the presently preferred embodiment of the invention utilizing a single 90° phase shift.

A further simplification and presently preferred embodiment is shown in FIG. 7. The symmetry of the two beams involving columns of elements results in some phases being in common for those two beams, and thus reduces switching requirements. Elements in FIG. 7 corresponding to those of FIG. 6 are identified by the same reference numerals. The configuration of FIG. 7 additionally includes phase reversals units 38, 39, each of which provides a 180° phase shift, and another phase shifter 40 which provides a 90° phase shift. The output of the 90° phase shift unit 40 is connected to one moving arm of a double pole, double throw switch 41, and the output of the phase reversal unit 39 is connected to the other moving arm of this switch.

In operation, for the first beam, the switches 34 are connected to the rows of the array and the switch 41 is connected as shown in FIG. 7. For the second beam, the switches 34 are actuated to connect signals of given phase to given columns. For the third beam, the switch 41 is actuated to reverse the phase trend across the columns. This configuration requires only 90° and 180° phase shift units, which are relatively simple to produce, the 180° unit calling for merely a reversal in polarity. In a still further simplification, certain elements of the array always share the same phase and can therefore be permanently connected and fed by the same input.

We claim:

1. In a system for remote measurement of wind velocity, the combination of:
    an array of acoustic transducer elements providing for transmitting a beam of acoustic energy along a path and receiving such transmitted energy as scattered by wind in said path;
    signal transmitting means including an electrical signal generator providing an electrical signal for driving said elements, and phase shifting means having said electrical signal as input and providing as output a shifted electrical signal;
    first switching means for selectively connecting said signals to said elements for driving selected elements at predetermined phases to produce first, second and third beams in sequence at three different angles;
    signal receiving means; and
    second switching means for connecting said elements to said signal receiving means.

2. A system as defined in claim 1 wherein said array is a square configuration comprising N columns and N rows where N is a small whole number.

3. A system as defined in claim 1 wherein said array is a cruciform configuration.

4. A system as defined in claim 1 wherein said array comprises columns and rows of elements, and one of said beams is produced by driving all elements in a column in phase, with adjacent columns out of phase with each other.

5. A system as defined in claim 4 wherein another of said beams is produced by driving all elements in a row in phase, with adjacent rows out of phase with each other.

6. A system as defined in claim 5 wherein the phase difference between the adjacent rows is 90°, and the phase difference between rows spaced apart a row is 180°.

7. A system as defined in claim 6 wherein said first switching means provides for interchanging the signals to the elements of one of odd or even numbered rows and leaving the signals unchanged to the elements of the other of odd or even numbered rows.

8. A system as defined in claim 1 wherein the bore sight angle of said array is tilted from the vertical at a given angle and said three beams are formed at substantially the same angle from boresight, which angle is approximately equal to said given tilt angle.

9. A system as defined in claim 8 wherein said given angle is about 21°.

10. A system as defined in claim 1 wherein said array comprises columns and rows of elements, with said columns divided into four groups, with said phase shifting means providing second, third and fourth signals in addition to said electrical signal, with said second, third and fourth signals shifted 90, 180 and 270 degrees, respectively, with respect to said electrical signal, with said electrical signal connected to the first of said groups, with said third signal connected to the third of said groups, and with said first switching means including means for connecting said second and fourth signals to the second and fourth of said groups, respectively, and connecting said second and fourth signals to the fourth and second of said groups, respectively.

* * * * *

REEXAMINATION CERTIFICATE (2100th)

United States Patent [19]
Balser et al.

[11] B1 4,558,594
[45] Certificate Issued  Oct. 12, 1993

[54] PHASED ARRAY ACOUSTIC ANTENNA

[75] Inventors: Martin Balser, Encino; Frank E. Ambler, Sepulveda, both of Calif.

[73] Assignee: Aerovironment Inc., Monrovia, Calif.

Reexamination Request:
No. 90/002,987, Mar. 1, 1993

Reexamination Certificate for:
Patent No.: 4,558,594
Issued: Dec. 17, 1985
Appl. No.: 624,465
Filed: Jun. 25, 1984

[51] Int. Cl.$^5$ ............. G01W 1/02; G01S 11/14
[52] U.S. Cl. ............. 73/170.16; 73/861.25; 73/170.13
[58] Field of Search ........... 73/170.13, 861.25; 367/90, 87; 343/700 R, 703

[56] References Cited
U.S. PATENT DOCUMENTS 3,735,333  5/1973  Balser et al. ............. 340/1 R
4,219,887  8/1980  MacCready, Jr. ............. 367/90
4,286,462  9/1981  Bourne ............. 73/189

FOREIGN PATENT DOCUMENTS
2499252  6/1982  France .

*Primary Examiner*—Donald O. Woodiel

[57] ABSTRACT

A system for remote measurement of wind velocity in the atmosphere, operating from ground level. An array of acoustic transducer elements which provide for transmitting a beam of acoustic energy along a path and receiving such transmitted energy as scattered by wind in the path. The system includes signal transmitting means for driving the arrays, and signal receiving means, with a switching system for connecting the elements of the array to the transmitting means and to the receiving means, for operation as a monostatic system. Phase control for the transmitted signals comprising phase shifters and switches for selectively connecting driving signals to the elements of the array for driving selected elements at different phases to produce first, second and third beams in sequence at three different predetermined angles from a single antenna.

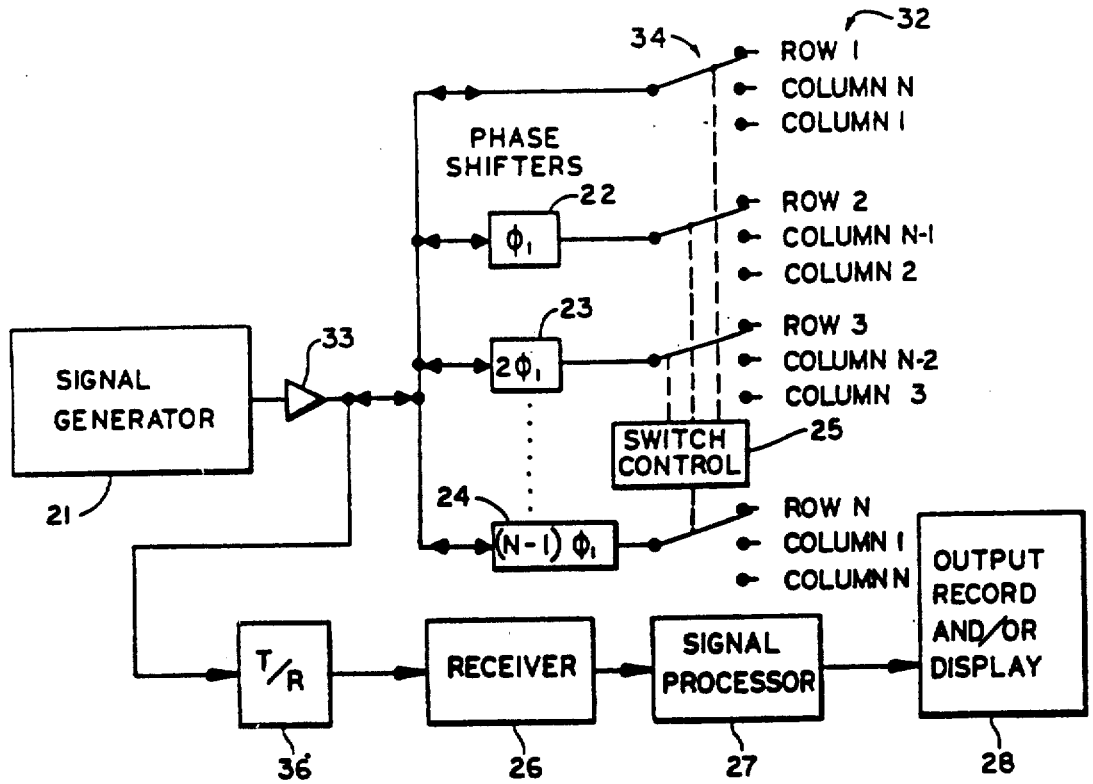

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *

REEXAMINATION CERTIFICATE (2310th)
United States Patent [19]
Balser et al.

[11] B1 4,558,594
[45] Certificate Issued Jun. 7, 1994

[54] PHASED ARRAY ACOUSTIC ANTENNA

[75] Inventors: Martin Balser, Encino; Frank E. Ambler, Sepulveda, both of Calif.

[73] Assignee: Aerovironment, Inc., Monrovia, Calif.

Reexamination Request:
No. 90/003,217, Oct. 8, 1993

Reexamination Certificate for:
Patent No.: 4,558,594
Issued: Dec. 17, 1985
Appl. No.: 624,465
Filed: Jun. 25, 1984

[51] Int. Cl.$^5$ .................. G01S 11/14; G01W 1/02
[52] U.S. Cl. .................. 73/170.16; 73/170.13; 73/861.25
[58] Field of Search .......... 73/170.13, 170.16, 861.25; 343/700 R, 703; 367/87, 90

[56] References Cited
U.S. PATENT DOCUMENTS

| | | |
|---|---|---|
| 3,821,740 | 6/1974 | Ehrlich . |
| 3,859,622 | 7/1975 | Hutchison et al. . |
| 3,860,928 | 1/1975 | Ehrlich . |
| 4,207,620 | 6/1980 | Morgera . |
| 4,286,462 | 9/1981 | Bourne . |
| 4,558,594 | 12/1985 | Balser et al. . |
| 5,208,785 | 5/1993 | Brumley et al. .......... 73/170.13 |

FOREIGN PATENT DOCUMENTS
2499252 8/1982 France .

OTHER PUBLICATIONS

Adekola, Sulaiman Adeniyi, A Study of the Radiation Patterns of a Shielded Quasi-Tapered Aperture Antenna for Acoustic Echo-Sounding; Cover; Authorization Page; Copyright page; pp. i–iii; Appendix C, pp. 196–216; Appendix D1, pp. 223–226, The Ohio State University, Ph.D. Thesis, 1975 (Xerox University Microfilms, copy furnished 1981).

*Primary Examiner*—Donald Woodiel

[57] ABSTRACT

A system for remote measurement of wind velocity in the atmosphere, operating from ground level. An array of acoustic transducer elements which provide for transmitting a beam of acoustic energy along a path and receiving such transmitted energy as scattered by wind in the path. The system includes signal transmitting means for driving the arrays, and signal receiving means, with a switching system for connecting the elements of the array to the transmitting means and to the receiving means, for operation as a monostatic system. Phase control for the transmitted signals comprising phase shifters and switches for selectively connecting driving signals to the elements of the array for driving selected elements at different phases to produce first, second and third beams in sequence at three different predetermined angles from a single antenna.

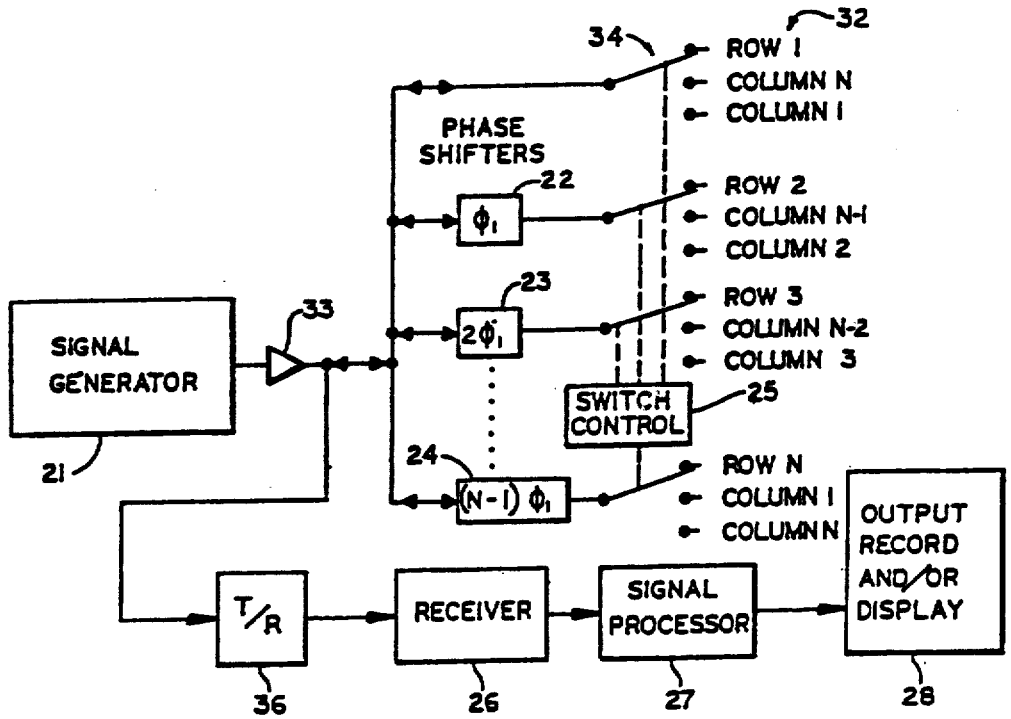

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *